United States Patent [19]

Ishizuka

[11] 4,097,208
[45] Jun. 27, 1978

[54] ULTRAHIGH PRESSURE APPARATUS FOR DIAMOND SYNTHESIS

[76] Inventor: Hiroshi Ishizuka, No. 19-2, Ebara 6-chome, Shinagawa-ku, Tokyo, Japan

[21] Appl. No.: 813,709

[22] Filed: Jul. 7, 1977

Related U.S. Application Data

[63] Continuation-in-part of Ser. No. 646,168, Jan. 2, 1976, abandoned.

[51] Int. Cl.² .............................................. B30B 11/32
[52] U.S. Cl. ............................... 425/77; 425/DIG. 26
[58] Field of Search .......................... 425/77, DIG. 26

[56] References Cited

U.S. PATENT DOCUMENTS

| | | | |
|---|---|---|---|
| 3,084,388 | 4/1963 | Ballhausen | 425/77 |
| 3,350,743 | 11/1967 | Ishizuka | 425/77 |
| 3,423,794 | 1/1969 | Wilson | 425/77 |
| 3,479,697 | 11/1969 | Kramarow | 425/77 X |
| 3,546,413 | 12/1970 | Ishizuka | 425/77 X |
| 3,674,403 | 7/1972 | Jonsson et al. | 425/77 |
| 3,727,028 | 4/1973 | Karatomi | 425/77 X |

*Primary Examiner*—J. Howard Flint, Jr.
*Attorney, Agent, or Firm*—Brady, O'Boyle & Gates

[57] ABSTRACT

An ultrahigh pressure apparatus for diamond synthesis or the like which comprises a pair of opposed frustoconical punches with a flat end surface, an annular die made of a very hard metallic material and placed between said punches, a hollow cylinder made of a sintered alumina to be free of pores having an inner diameter substantially equal to that of the flat end surface of the punches, a pair of gaskets around and adjacent to the flank of said punches which gaskets each having an outer diameter larger than that of said hollow cylinder and said die having at the middle portion thereof a substantially concentric cylindrical projection of an axial length equal to that of said hollow cylinder so that the bore is tightly fitted to the gaskets and the hollow cylinder.

3 Claims, 5 Drawing Figures

ULTRAHIGH PRESSURE APPARATUS FOR DIAMOND SYNTHESIS

CROSS REFERENCE TO RELATED APPLICATION

This application is a continuation-in-part of my copending application Ser. No. 646,168, filed Jan. 2, 1976 for Ultrahigh Pressure Apparatus, now abandoned.

The present invention relates to an improvement in or relating to a high pressure apparatus, and more particularly to such apparatus for synthesizing diamonds or for another phase conversion of minerals, which comprises a pair of opposed frustoconical punches each having a flat end surface, an annular die having a substantially cylindrical bore of a diameter larger than that of each punch flat end surface, a hollow cylinder made of small compressibility coefficient material and having an outer diameter substantially same with that of said flat end surface of each punch and positioned coaxially within the die cylindrical bore and gaskets placed respectively at the ends of said cylinder.

It has been long desired by those engaged in high pressure techniques, such as diamond synthesis or like phase convension of minerals, that they may provide a reaction chamber, or a space available for reaction specimen, of an increased volume in their high pressure apparatus in order to improve their economical efficiency by increasing the yield per run, or to obtain higher quality and larger size diamond crystals by properly controlling temperature gradient.

In this view point many attempts have been made to increase the volume of the reaction chamber. In case of the above apparatus in which an annular die is used, such increment can be approached from increasing either the radial dimensions or the axial length of the die alternatively.

Increasing the axial length is preferred because of possibility to readily provide a rather a wide extent of a same temperature, but, though attempts could have been made, no cases have been heard of in which an elongated die has been successfully operated. This can be attributed to difficulties to be encountered in designing an apparatus which comprises such an axially elongated die. For example, increasing the axial length of the die requires in an increased thickness of gaskets so as to obtain an increased compressive stroke, such gaskets being placed in a space surrounded by a bore end portion and a flank of each punch, and results in decreased sealing ability of the gaskets, for such ability decreases in inverse proportion to their thickness. The decrement so caused can be offset by an increased length of sealing portion of the gaskets, but their designing has been quite a puzzle and not published.

On the other hand, it has been also desired that some strong steel may be substituted as a die material for conventionally utilized sintered WC-Co alloy, because of their good machinability, higher feasibility of heat treatment and especially their being less expensive.

In order to provide a reaction chamber of an increased volume inside an annular die of steel, in which chamber such a high pressure condition as required for diamond synthesis is capable of being maintained, a series of high pressure apparatuses have been developed by the Inventor, which utilize a hollow cylinder made of a very rigid material with a very small compressibility coefficient, and placed adjacent to the bore of the die so that it may serve to decrease compressive stresses on the bore. Many of them have been applied for a patent and granted. U.S. Pat. No. 3,350,743, one of such patents, discloses an apparatus provided with about 30 mm⁰ × 20 − 30 mm of reaction chamber in which a pressure can be generated and maintained of up to 50,000 atmospheres utilizing asteel die.

However, a steel die, in general, suffers from plastic deformation more or less caused at the bore of the die in repeated runs even when the hollow cylinder effectively serves to reduce the stresses. Thus deformation is required to be removed from the bore of the die for a snug fitting of the hollow cylinder to the die, by cutting or grinding off such deformed portions at a given interval, thus making a smooth surface of the bore. And such deformation removal is necessary on the entire bore surface, from the upper to lower ends. Further press loads requirement is necessary to be determined for every such removal due to changes in cross section of compression and modification is also required of dimensions of elements to be placed for reaction inside the bore of the die.

This invention is to provide an ultrahigh pressure apparatus on an industrial scale, which can be reddily operated and has been free from the above said disadvantages, and in which a reaction chamber is provided of an increased volume, and a die of steel may be utilized.

In practice, this invention is embodied as an apparatus which comprises
(1) a pair of opposed frustoconical punches with a flat end surface;
(2) an annular die made of a very hard metallic material and placed between said punches;
(3) a hollow cylinder made of a sintered alumina to be free of pores having an inner diameter substantially equal to that of the flat end surface of the punches;
(4) a pair of gaskets around and adjacent to the flank of said punches which gaskets each having an outer diameter larger than that of said hollow cylinder;
said die having at the middle portion thereof a substantially concentric cylindrical projection of an axial length equal to that of said hollow cylinder so that the bore is tightly adjacent to the gaskets and the hollow cylinder.

Here, such cylindrical projection can be a separate collar body tightly contacted with the base of the die. Further, the collar body may consist of a plurality of radial segments.

The features and advantages of the invention will be better understood from the following description, taken in connection with the accompanying drawing, in which.

Figure 1:
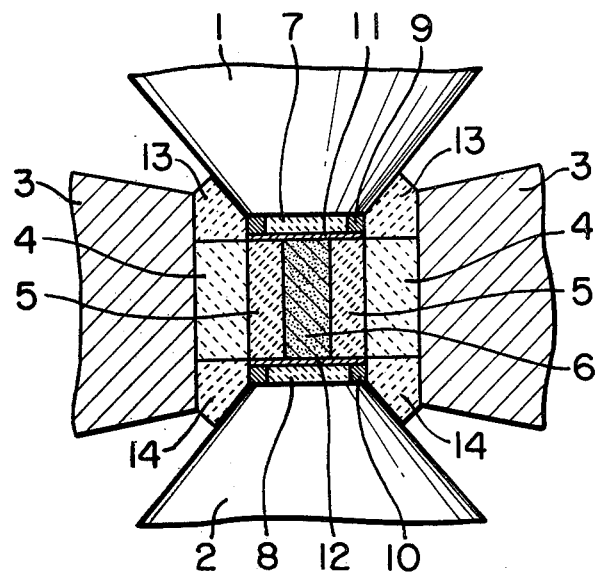
FIG. 1 is a vertical sectional view of the main part of a conventional ultrahigh pressure apparatus utilizing the hollow cylinder.

In FIG. 1, an annular die 3 of steel, such as die steel or high speed steel, is placed between a pair of opposed punches 1, 2, which are made of a very hard alloy such as a sintered WC-Co alloy. Adjacent to the bore of the die 3 is placed a hollow cylinder 4, made of alumina sintered to be almost free from pores. A refractory tube 5 surrounds a reaction chamber 6, and tablets 7, 8 are for termal and electrical insulation and are made of a refractory material fired to be rigid. For electrical conductance steel rings 9, 10 and therminal plates 11, 12 are arranged. Gaskets 13, 14 are of a fired alumina silicate.

Figure 2:
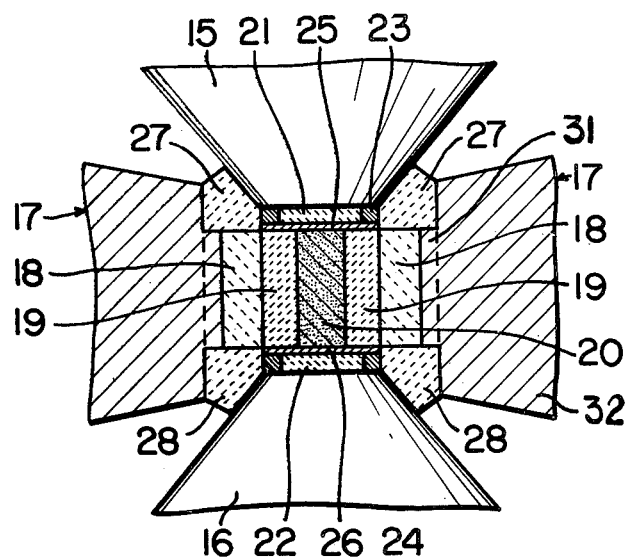
FIG. 2 is a vertical view of the main part of the first apparatus of this invention which shows its section.
Figure 3:
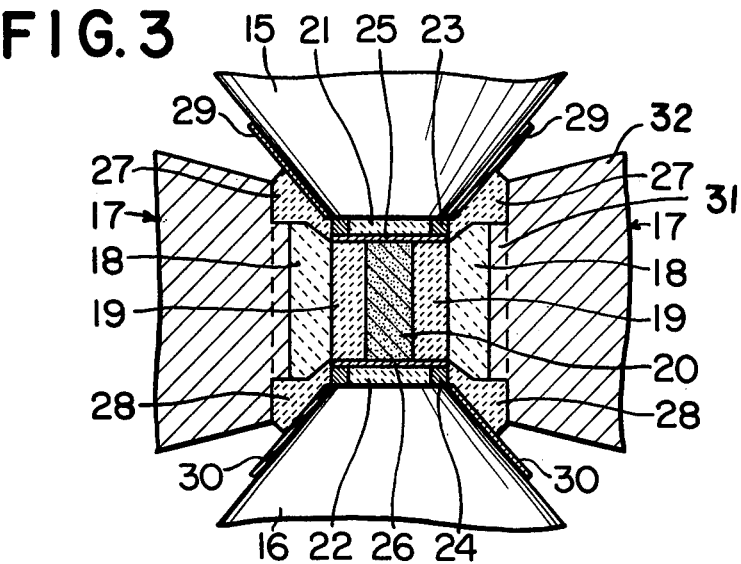
FIG. 3 is a vertical sectional view of the main part of the second apparatus of the invention.
Figure 4:
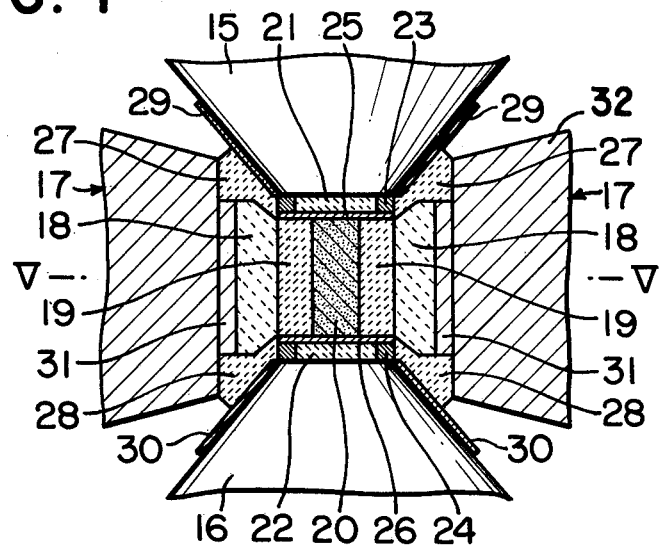
FIG. 4 is a vertical sectional view of the main part of the third apparatus of the invention.

Of FIGS. 2, 3 and 4, which illustrate some embodiments of the invention, FIG. 2 exemplifies an arrangement suitable for a comparatively small apparatus utilizing a hollow cylinder 18. FIGS. 3 and 4 are for a comparatively large apparatus utilizing such cylinder 18.

The arrangement in FIG. 3 or 4 shows a hollow cylinder 18 with tapered ends facing to the flank of punches 15, 16.

The tapered ends are provided on the cylinder 18 in order to increase a stress support for the cylinder 18 against the deformation under high pressures generated in a reaction chamber 20; to improve the sealing ability of gaskets 27, 28 for the pressures, by reducing its gradients within the gaskets 27, 28 adjacent to the flank of punches 15, 16 and to protect punches 15, 16 from breakup.

In FIGS. 2 to 4, an annular die 17, made of a steel such as die steel or high speed steel is placed between and coaxially with a pair of opposed punches 15, 16, which are made of a sintered WC-Co alloy. Adjacent to the bore of the die 17 is placed a hollow cylinder 18, which is made of alumina sintered to be almost free of pores. A refractory tube 19 surrounds a reaction chamber 20. Tablets 21, 22 of a refractory material fired to be rigid are arranged for thermal and electrical insulation, and steel rings 23, 24 and termainal plates 25, 26 are for electrical conductance. Gaskets 27, 28 are made of a fired alumina silicate. The punches 15, 16 have a protector 29, 30 on them in the arrangement of FIGS. 3 and 4.

An actual construction example is described with reference to the arrangement of FIG. 2. The punches 15, 16 have a flat end surface 20 mm across and are axially tapered at 33°. The die 17 has a stepped bore of 30 mm and 34 mm by diameter at the portions adjacent to the hollow cylinder 18 and to the gaskets 27, 28, respectively. The cylinder 18 has a 20 mm inner diameter and is 10 mm high. Gaskets 27, 28, larger in outer diameter than such cylinder 18 are placed adjacent to the bore of the die 17.

Figure 5:
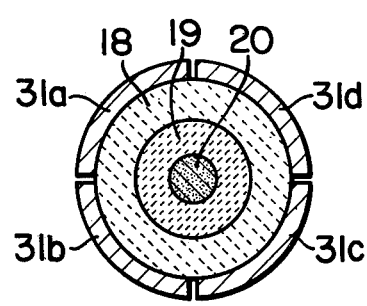
FIG. 5 is a horizontal sectional view of the embodiment in FIG. 4 as taken at V—V, showing only a metallic collar body, a hollow cylinder, a reaction chamber and a refractory tube surrounding the chamber.

FIG. 5 illustrates a section of the arrangement in FIG. 4, as taken at V—V, showing only a metallic collar body 31, a hollow cylinder 18 and a refractory tube 19 that surrounds reaction chamber 20. In this figure, such collar body 31 is formed of four quarter-circle segments 31a – 31d), while in FIG. 4 it is unitarily formed.

Referring to the arrangement in FIG. 3, the punches have a flat end surface 75 mm across and are axially tapered at 36°. The die has a stepped bore which has 165 mm and 185 mm inner diameters at the portions adjacent to the cylinder and to the gaskets, respectively. The cylinder is 100 mm high and 75 mm by inner diameter. The protectors for punches are a mild steel plate which is about 2 mm thick, and are tightly placed on them.

In an actual construction of the apparatus shown in FIG. 4, the punches have a flat end surface 75 mm across and are axially tapered at 36°. The die consisting of a base 32 and a metallic collar body 31 has a stepped bore of 165 mm and 185 mm inner diameters at the portions adjacent to the hollow cylinder and to the gaskets, respectively. The cylinder is 100 mm high and has 75 mm inner diameter. The protectors for the punches are a mild steel plate about 2 mm thick and are tightly placed on them. The larger end of protectors has a diameter larger than the bore of the die in each of FIGS. 3 and 4 and according to any embodiment of this invention, the gaskets having an outer diameter larger than the hollow cylinder of sintered alumina are placed adjacent to the inner bore of the die.

As might be understood from the above description of actual construction examples of the apparatus of the invention with reference to the drawing, the apparatus according to this invention has permitted of several functions and advantages over any conventional ones, by using gaskets each having a larger outer diameter than the hollow cylinder and are placed adjacent to the bore of the die at the enlarged portion.

In this invention, the die is made of a hard metallic material, such as die steel, high speed steel, carbon structural steel, alloy steel, alloy structural steel, etc. When the cylindrical projection is provided as a separate collar body, it can be made of steel of such grades same or different from the one consisting the base portion of the die. alternatively it can be made of a sintered WC-Co alloy.

As would be apparent from the above description, the most outstanding features of apparatuses of the present invention are utilization of gaskets each having an outer diameter larger than the hollow cylinder, and stepped bore configuration of the die such that the gaskets and the hollow cylinder may snugly fit to the bore.

From such features the advantages have been obtained in the present invention such that:

(1) By offsetting sealing ability decrement of gaskets with an increased length, the invention has permitted to use a gasket sufficiently thick for resulting in an elongated reaction chamber, increased compressive strokes, and finally improved yield per run. In comparison of workabilities utilizing apparatus conventionally designed and according to this invention, both comprising an annular die which is 165 mm by inner diameter, reaction charges have been treated according to the invention, twice as much as the conventional one could, with requirement of press load larger than the latter by about 10%. No difference was appreciated in lives of the dies.

(2) In comparison with a conventional case where it has been required to increase press loads for compression according to the enlargement of the aperture caused by deformation removal, this invention has permitted of stable operations by utilizing unchanged press loads, regardless of such enlargement of the bore at the portion adjacent to the hollow cylinder. This is because, since the inner diameter of the die remains unchanged at the end portion of the bore, the compressive forces are divided at a substantially unchanged ratio for materials of the reaction chamber from the flat end surfaces of punches and for the hollow cylinder through gaskets from the flanks of punches.

(3) In comparison with the conventional case where it has been further required to modify the dimension of gaskets in outer diameter to fit an enlarged bore of the die, such modification is unnecessary according to this invention, and each element for reaction is very simply machined and manufactured.

(4) Deformation removal of the bore of the die can be made efficiently in an apparatus according to the invention, since such deformation removal is required only at the portion adjacent to the hollow cylinder, in contrast with the conventional case where such removal has been required from end to end of the bore of the die. (5) In placing elements for reaction within the bore of a die, they are readily positioned in an apparatus according to the invention, with provision of the cylindrical projection of the same axial length on the die as a hollow cylinder adjacent to it.

(6) In an embodiment of the invention where the cylindrical projection consists of a separate collar body of very hard metallic material tightly fitted to the bore of the die, the latter survives conventional ones without such collar body; for such collar body can be taken out for substitution by a fresh one when it has an unsuitably enlarged bore or is broken in repeated runs.

(7) When the collar body is formed of a plurality of radial segments damaged ones alone are required to be substituted, thus reducing compensation of expensive collar has been permissible.

I claim:

1. An ultrahigh pressure apparatus for diamond synthesis or the like which comprises:
   (1) a pair of opposed frustoconical punches with a flat end surface;
   (2) an annular die made of a very hard metallic material and placed between said punches;
   (3) a hollow cylinder made of a sintered alumina to be free of pores having an inner diameter substantially equal to that of the flat end surface of the punches;
   (4) a pair of gaskets around and adjacent to the flank of said punches which gaskets each having an outer diameter larger than that of said hollow cylinder;
   said die having at the middle portion thereof a substantially concentric cylindrical projection of an axial length equal to that of said hollow cylinder so that the bore is tightly fitted to the gaskets and the hollow cylinder.

2. An ultrahigh pressure apparatus as claimed in claim 1, in which said die consists of a base which has a substantially straight cylindrical bore of a diameter equal to the outer diameter of the gaskets and a cylindrical collar body of a metallic material same or similar to that of the base.

3. An ultrahigh pressure apparatus as claimed in claim 2, in which said cylindrical collar body consists of a plurality of radial segments.

* * * * *